(12) United States Patent
Lundqvist

(10) Patent No.: US 8,884,467 B2
(45) Date of Patent: Nov. 11, 2014

(54) SYSTEM AND METHOD FOR PROTECTING AN ELECTRICAL POWER GRID

(71) Applicant: Bertil Lundqvist, Vasteras (SE)

(72) Inventor: Bertil Lundqvist, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/077,913

(22) Filed: Nov. 12, 2013

(65) Prior Publication Data
US 2014/0063669 A1 Mar. 6, 2014

Related U.S. Application Data

(63) Continuation of application No. PCT/EP2011/058142, filed on May 19, 2011.

(51) Int. Cl.
*H01H 31/34* (2006.01)

(52) U.S. Cl.
USPC .......................................................... 307/97

(58) Field of Classification Search
USPC .......................................................... 307/97
See application file for complete search history.

(56) References Cited

U.S. PATENT DOCUMENTS

| | | | |
|---|---|---|---|
| 3,223,889 | A | 12/1965 | Schweitzer, Jr. |
| 6,456,947 | B1 | 9/2002 | Adamiak et al. |
| 7,738,221 | B2 | 6/2010 | Kojovic et al. |
| 2009/0295231 | A1 | 12/2009 | Gaffney et al. |
| 2011/0063749 | A1 | 3/2011 | Liu |
| 2011/0063767 | A1 | 3/2011 | Kasztenny et al. |
| 2011/0063769 | A1 | 3/2011 | Kasztenny et al. |

FOREIGN PATENT DOCUMENTS

| | | |
|---|---|---|
| EP | 2282054 A2 | 2/2011 |
| GB | 523603 A | 7/1940 |
| JP | 2001231157 A | 8/2001 |
| WO | 2007051322 A1 | 5/2007 |
| WO | 2008134994 A1 | 11/2008 |

OTHER PUBLICATIONS

International Preliminary Report on Patentability, Application No. PCT/EP2011/058142, Completed: Jun. 17, 2013, 5 pages.
International Search Report and Written Opinion of the International Searching Authority, Application No. PCT/EP2011/058142 Completed: Jan. 11, 2012; Mailing Date: Jan. 20, 2012 9 pages.
Z. Gajic, et al.; "Practical experience from multiterminal line differential protection installations"; conference Relay protection and Substation Automation of Modern Power Systems (Cheboksary, Sep. 9-13, 2007); 6 pages.

*Primary Examiner* — Robert L. Deberadinis
(74) *Attorney, Agent, or Firm* — St. Onge Steward Johnston & Reens LLC

(57) ABSTRACT

A differential protection system including a plurality of inputs power cables for transfer of power from electric power generators, such as wind power generators, to an output cable. Each input and output power cable is provided with a respective circuit breaker. The protection system includes a plurality of protection equipment unit each being adapted to be arranged at a respective one of the input cables or at the output cable, each protection equipment unit including a measuring unit for measuring the current and voltage of the cable, and including a control unit being operatively connectable to the circuit breaker of the respective power cable for selectively tripping the circuit breaker when the protection system discovers a differential fault. The protection system includes a charging current compensator for compensating the differential protection for charging currents of the cables of the transfer system.

18 Claims, 3 Drawing Sheets

SYSTEM AND METHOD FOR PROTECTING AN ELECTRICAL POWER GRID

FIELD OF THE INVENTION

The invention relates to methods and arrangements for protection of electrical power networks, especially cable networks for windmill farms.

BACKGROUND OF THE INVENTION

Windmill Farms

Windmill farms, or wind power plants, are normally designed to generate power at low voltage or medium voltage. When the generator is generating at low voltage (typically <1000 V) a step-up transformer on board the windmill is used to increase the generated voltage to typically 12-36 kV to reduce the cable size (and cost). A medium voltage generator, typically 12 kV, is an alternative which eliminates the need for a step-up transformer onboard the windmill.

The power from the windmill farm is normally collected in a windmill transformer substation, either underwater, or on a supporting structure above the water level (or on land).

The windmill substation can collect the power from a cluster of windmills and further step up the voltage to reduce cable cost and allow transfer of more power.

The high voltage cable from a cluster of wind power generators is normally collected on a central platform, which collects the power from a number of wind power generator clusters. This platform can transport the power to land via High Voltage DC or AC cables.

Such multi-ended power networks are complex constructions and require a number of protection devices.

EP2282054 (D5) describes a wind power plant, wherein a plurality of wind power generators, each including a transformer (40 in D5), are grouped and connected into a common feeding cable (44 in D5), which feeding cable is further interconnected with another similar feeding cable to a substation transformer (12 in D5). The substation (48 in D5) in turn provides a grid connection (34 in D5). For protection against faults occurring in the system of feeding cables, circuit breakers are arranged in each end of the cable system, i.e. one in each end of the two common feeding cables (44) and one circuit breaker (62) at the connection between the cable system and the substation transformer (12) (§45 in D5). Arranging protection equipment in this way and having a circuit breaker in both ends of each cable requires a lot of equipment if such a protection system is arranged at a wind power plant having many power generators. This kind of protection adds costs when the number of power generators and cables from the power generators are increased in order to scale up the wind power plant.

Differential Protection

The invention provides differential protection of a wind power plant using protection equipment similar to the technology used for protecting transmission lines in power grids. Such equipment is not discussed in detail in document D5. Therefore a short survey of differential protection methods and systems used, from other fields than wind power plant protection, will be provided in the following.

Differential protection is a well known method for protecting transmission lines. For example, UK patent application GB 523,603 describes differential protection for AC systems using differential relaying for protecting power lines, power transformers, A.C. generators and station bus systems, wherein each phase of the current entering the system is compared with the current leaving the system (see D1 page 1, lines 10-14, 32-46). The ratios of the power transformers of the system is compensated for, by choosing the measuring current transformers to have corresponding ratios, so that the currents from the current transformers should be a total of zero, i.e. ingoing currents equal to outgoing currents of a protected zone of the system, when there is no fault in the protected zone. When a fault occurs in the protected zone (1 in FIG. 1), a differential current is created, which current causes a protective relay to operate and trip circuit breakers and disconnect the faulted equipment (see D1, page 1, lines 46-77). Moreover, the protective circuit of D1 (see for example FIG. 1 of D1) includes an operative winding 13 that is trigged by a differential current, but also a restraining coil 12 that is trigged by an inrush current, wherein the restraining coil 12 compensates for inrush magnetizing currents of transformers in the protected zone (see D1 page 2, lines 73-93). In this way the protective circuit of D1 prevents false operation of the differential protective arrangement by a restraining effect, which is adapted to react upon a harmonic of the secondary current of the measuring current transformer, so that the relay operates only when a fault exists in the protected zone (1) (see D1 page 3, line 28-47). The protected zone (1 of D1) comprises for example a combination of two or more of a power transformer, machine, station bus and power line and in the example illustrated in FIG. 1 of D1 three circuit breakers 5 connect three power circuits 2, 3, 4 to the zone 1 (page 3, lines 106-130). The current to and from these circuits are monitored by current transformers 8 of the protective circuit.

A magnetizing inrush current affects the differential current, which is illustrated in FIG. 4 in D1, and the differential current shows a high second harmonic (page 4, lines 43-54). The protective relay circuit is designed to restrain on this second harmonic (page 4, lines 67-79) and also on currents from a saturated measuring current transformer, for example by means of a restraining coil 12 (page 4, lines 114-120). Thus, D1 describes a system for differential protection, wherein the protective circuit compensates for inrush currents of transformers, so that when a switch is closed to apply voltage to a transformer winding, the protective relay is restrained from tripping the circuit breaker.

FIG. 10 of D1 illustrates protection of a power transmission line wherein a pilot conductor (one for each phase 48, 49, 50) is used for transferring measuring currents from the current transformers 8 that measure the currents entering and leaving the transmission line (45-47).

An alternative to use pilot conductors is described in U.S. Pat. No. 3,223,889 (D2), wherein a protective circuit, for protecting a power circuit, uses for example radio (see D2, FIG. 2 and column 2, line 30-32) for transmission to a trip control means. FIG. 6 of D2 illustrates employing a radio link for transferring control signals including a second harmonic of the power circuit (see D2 column 2, line 45-54).

Differential protection have since been developed further becoming more and more sophisticated and intelligent. WO2007/051322 (D3) describes an arrangement for protecting an electrical power system comprising a plurality of protective relays provided with a respective phasor measurement facility for measuring synchronized current values at different locations and including a respective data communication module for communicating such current values with each other via a communication link (see abstract of D3). Such systems use Phasor Measurement Units that provide time-stamped measurements, so called phasors, of currents, voltages and loads, being synchronized and time-stamped by means of Global Positioning Satellites (e.g. GPS) (see D3 page 3 line 1-12). The communication link may include an optic fiber link. D3 also describes line differential protection of a multiterminal system, illustrated by five terminals in a protected zone (illustrated by dashed line in FIG. 2), which protected zone is defined and protected by five respective relays (2), one relay for each terminal end (page 8, line 23-29).

US2011/0063767 (D4) describes line current differential protection of a line, or a multi-terminal line system, which protection includes compensation of charging currents. Each end, or node, of the system measures the current and compensates for the charging current of its cable, before (see abstract, FIG. 18, and §67 of D4) transmitting a current value. Thus, each node sends a compensated current value calculated from the measured current and a subtracted charging current to the other nodes. Each node also calculates (§68) an overall differential current from its own transmitted current value and all received current values of the other nodes. The sum of the charging currents used in the nodes should equal the total charging current of the cable system (§69).

The paper "Practical experience from multiterminal line differential protection installations" by Z. Gajic et al (document D6) from the conference Relay protection and Substation Automation of Modern Power Systems (Cheboksary, Sep. 9-13, 2007) describes experience from protection tests. The document D6 describes two installations, a first installation protecting a five terminal line, and a second installation protecting a three end line. In each end of the lines, a circuit breaker and a current and voltage measuring device is arranged. The installations use a line differential protection unit for measuring the current and voltage, and tripping the circuit breaker, which protection equipment unit is of type RED 670, provided by ABB. The protected zones do not include any transformers. However, such equipment like RED 670 can handle transformers and charging currents within a protected zone. For example, charging currents can be handled by an RED 670 by reducing its sensitivity a short time period during charging of a cable, so that the charging current is not interpreted as a fault current. The invention proposes a system for protection using similar protection equipment modified for controlling more complex systems, like multi-terminal systems for transfer of power from several generators.

U.S. Pat. No. 6,456,947 discloses a method of detecting faults on a power transmission line system including simultaneously measuring phase current samples at each phase of each transmission terminal; calculating real and imaginary phaselets comprising partial sums of the phase current samples; for each phaselet, calculating a respective partial sum of squares of each phase current sample; calculating the sums of the real and imaginary phaselets over a variable size sliding sample window; calculating real and imaginary phasor components from the phaselets and a sum of the partial sums of the squares over the sample window; using the sums of the real and imaginary phaselets, the real and imaginary phasor components, and the sum of the partial sums of the squares to calculate a sum of squares of errors between the phase current samples and a fitted sine wave representative of the real and imaginary phasor components; using the sum of squares of errors to calculate a variance matrix defining an elliptical uncertainty region; determining whether a disturbance has occurred, and, if so, re-initializing the sample window; and determining whether a sum of current phasors from each terminal for a respective phase falls outside of the elliptical uncertainty region for the respective phase.

US 2011/0063769 discloses current differential protection for a multi-terminal power apparatus, such as a power transmission line. Currents measured at each of the multiple terminals are used to calculate a differential current and a restraining current, which are then converted into a first equivalent current and a second equivalent current of an equivalent two-terminal power apparatus. In the equivalent two-terminal power apparatus, a differential current derived from the first and second equivalent currents is substantially equal to the differential current of the original multi-terminal power apparatus. Similarly, a restraining current derived from the first and second equivalent currents is substantially equal to the restraining current of the original multi-terminal power apparatus. The first and second equivalent currents may be used in an alpha plane analysis to determine whether or not to trip the multi-terminal power apparatus.

SUMMARY OF THE INVENTION

An aim of this invention is to address the problem of complex power systems, such as wind power generating networks, and facilitate detection of faults. The disclosure describes a method and apparatus for detection of cable faults in multi-ended electrical power networks, especially cable networks for wind mill farms.

In principle, if the network is functioning the sum of all cable currents should be zero, i.e. all currents entering the system should leave the system and measuring in every end of the power system reveals, in accordance with Kirchoffs law, if current leaks somewhere in-between. If a transformer that steps-up the voltage is included in the power transferring system between the entering and leaving nodes, a compensation for the transformer ratio should be performed. Moreover, current compensation should preferably also be performed for other current affecting elements and events, such as for example the inrush currents of transformers of the system.

For this purpose the invention provides a system for protection of a power transfer system, especially a protection system with differential current protection of a multi-ended power network. The invention uses current differential protection to detect faults, by measuring the currents of the cables entering and leaving the protected zone of the power system.

The invention provides a differential protection system for a power transfer system, which power transfer system comprises a plurality of power cables including a plurality of input power cables for transfer of power from electric power generators, such as wind power generators, an output cable, wherein the plurality of input power cables are connected to the output cable, so that the output cable provides a common output for the input power cables. Preferably, the plurality of power cables of the power transfer system also include at least one or preferably a plurality of transfer cables connecting the input cables to the output cable, wherein the input cables are arranged in cable branches and join the output cable via the transfer cables. Each input and output power cable is provided with a respective circuit breaker, wherein each circuit breaker of the input power cables provides a power input to the transfer system, and the circuit breaker of the output cable provides a power out for the transfer system. Preferably also, the transfer system comprises at least one transformer connected between the input cables and the output cable, which transformer is arranged to transform power from the input cables to the output cable. The protection system according to the invention comprises a plurality of protection equipment units each being adapted to be arranged at a respective one of the input cables or at the output cable for measuring the current and voltage of the cable, and operatively connectable to the circuit breaker of the respective power cable for selectively tripping the circuit breaker when the protection system discovers a differential fault. The protection system further comprises at least one charging current compensator for compensating the differential protection for charging currents of the cables of the transfer system, the transfer system being arranged to transfer power from a varying number of the electric power generators wherein the power cables being in use varies, and wherein the protection system is adapted to adjust the compensation for the varying use of the transfer system.

Note that, the protection adapts to a varying electrical topology of the transfer system.

Especially, the compensation is varied on the basis of the power cables being unused and which unused power cables potentially need to be charged.

In an embodiment the differential protection system comprises a database that includes charging currents, wherein the adaptation of the charging current compensation includes using charging currents stored in the database.

Preferably the differential protection system comprises a topology determiner for determining the electrical topology of the transfer system, and the database includes a charging current for each topology.

In an embodiment the differential protection system comprises a master protection unit for controlling each of the protection equipment units.

Preferably, the master protection unit comprising a communication unit and each protection equipment unit comprises a corresponding communication unit for operatively connecting the master control unit to each of the protection equipment units.

Preferably, the master protection unit comprises the topology determiner.

Preferably, the master protection unit comprises a differential fault determiner, the protection system discovers differential faults by means of the differential fault determiner using currents provided from measurements by the measuring units of protection equipment units.

In an embodiment, each of the protection equipment units of the input cables comprises a charging current compensator for providing a charging current compensation upon connecting the respective input cable.

In an embodiment, the differential protection system further comprises a transformer inrush current determiner for detecting inrush current of a transformer of the protected power transfer system, and wherein the protection system is adapted to block the differential protection during a transformer inrush current.

Preferably, each protection equipment unit of the power input cables comprises an inrush current determiner and is adapted to block communication between the protection equipment unit and the master protection unit when detecting an inrush current of a transformer of the transfer system.

In a preferred embodiment, the transfer system includes a multi-terminal transfer cable connecting the input cables to the output cable, the protection system being adapted for compensating for the charging of different sections of the multi-terminal cable. The input cables constitute branches of the transfer cable system, each branch for introducing power from a respective power generator into the transfer system. The charging compensation being varied on basis of uncharged cables, uncharged cable branches and uncharged sections of the transfer cable that may be connected for power transfer, so that upon connection of these cables, branches and sections, the charging currents needed are compensated for.

The invention also provides a method for differential protection of a power transfer system, which power transfer system comprises a plurality of power cables including a plurality of input power cables for transfer of power from electric power generators, such as wind power generators, an output cable, wherein the plurality of input power cables are connected to the output cable. Each input and output power cable of the power transfer system is provided with a respective circuit breaker, wherein each circuit breaker of the input power cables provides a power input to the transfer system, and the circuit breaker of the output cable provides a power out for the transfer system, the transfer system being arranged to transfer power from a varying number of the electric power generators wherein the power cables that are used in the present point of time varies. The differential protection method comprises determining the electric topology from the present use of the power cables, measuring the current and voltage of the input and output cables, compensating for charging currents of the cables of the transfer system using charging currents corresponding to the determined electric topology, selectively tripping the circuit breakers upon discovering a differential fault.

In an embodiment, the compensating includes retrieving stored charging currents corresponding to the electric topology.

In an embodiment, the method includes monitoring the power cables for a transformer inrush current and inactivating the differential protection during an inrush current.

In an embodiment, the method includes transmitting the compensated charging currents from local protection equipment units to a master protection control unit, performing a differential protection calculation for discovering faults in the master protection and upon discovering a fault transmitting trip commands to the protection equipment units.

The invention also provides a protection equipment unit for differential protection of a power system, which power transfer system comprises a plurality of power cables including a plurality of input power cables for transfer of power from electric power generators, such as wind power generators, an output cable, wherein the plurality of input power cables are connected to the output cable, each input and output power cable being provided with a respective circuit breaker, wherein each circuit breaker of the input power cables provides a power input to the transfer system, and the circuit breaker of the output cable provides a power output for the transfer system, the transfer system being arranged to transfer power from a varying number of the electric power generators wherein the power cables being in use varies. The protection equipment unit is adapted to be arranged at a respective one of the input cables or at the output cable, and the protection equipment unit comprises a measuring unit for measuring the current and voltage of the cable, a control unit being operatively connectable to the circuit breaker of the power cable for selectively tripping the circuit breaker, a charging current compensator for compensating the differential protection for charging currents of the cables of the transfer system, a communicating unit. The protection equipment unit is adapted for transmitting a compensated current by means of the communicating unit, and the charging current compensator is adapted to adjust the compensation for the varying use of the transfer system.

In an embodiment the protection equipment unit is adapted for receiving an electric topology identification of the power transfer system by means of the communication unit, and the charging current compensator is adapted to use a charging current corresponding to the electric topology for compensating the measured current.

In an embodiment the protection equipment unit comprises a database for storing a plurality of stored charging currents, each corresponding to an identifier of an electric topology, and wherein the charging current compensator is adapted to retrieve a charging current stored in the database corresponding to the received electric topology information.

In an embodiment the protection equipment unit comprises a transformer inrush current determiner operatively connected to the communication unit and adapted to block the communication unit from transmitting upon detecting a transformer inrush current.

BRIEF DESCRIPTION OF THE DRAWINGS

The invention will be described with reference to the drawings. The drawings are provided for illustrative purposes and for facilitating using the invention, and they are simplified and not drawn to scale.

DETAILED DESCRIPTION OF THE INVENTION

The invention provides the possibility to protect multi-ended cable networks in a similar way as with a bus bar protection, i.e. an algorithm based on Kirchhoff's law is used to detect if there is a fault inside the cable network.

The protection function may be based on phasor comparison of time tagged current vectors in all ends. If the sum of all vectors is zero, there is no fault in the cable network.

For example the multi-ended protection can be based on Phasor measuring units, wherein time tagged samples or phasors are sent over communication links. The sensitivity and selectivity of the applicable function is depending on accurate time-tagging, which can be achieved by so called Echo-timing or by GPS time tagging at each individual end.

If the sum deviates from zero (+−inaccuracy of measurement data), a fault is detected.

The invention is adapted for protecting systems with cables and transformers inside the protected zone of the system and additional features for charging current compensation and handling transformer inrush currents is included.

A benefit of including a plurality of cables and at least one transformer in a protected zone compared to protecting each cable and transformer individually is that the protection zone reduces the number of current transformers, communication channels and protection devices that are needed.

The measured current data may be sent from protection equipment at each wind power generator unit to the central platform via for example fiber optic cables or microwave radio. Each incoming current is suitably collected in a central unit, where a differential protection evaluates if the system is faulty or not.

The system should be adapted to work similar to a busbar differential protection, and preferably also includes extended functionality for charging current compensation and inrush current detection/blocking for the transformers in the system.

The present invention may utilize phasor measurement units for sampling current vectors from different locations, such as cable ends at wind farm mills, which are synchronized by means of a common time, for example a GPS time is used. The synchronized phasors are compared, in a real time comparison, and Kirchoffs law for currents is used to detect faults.

Figure 1:
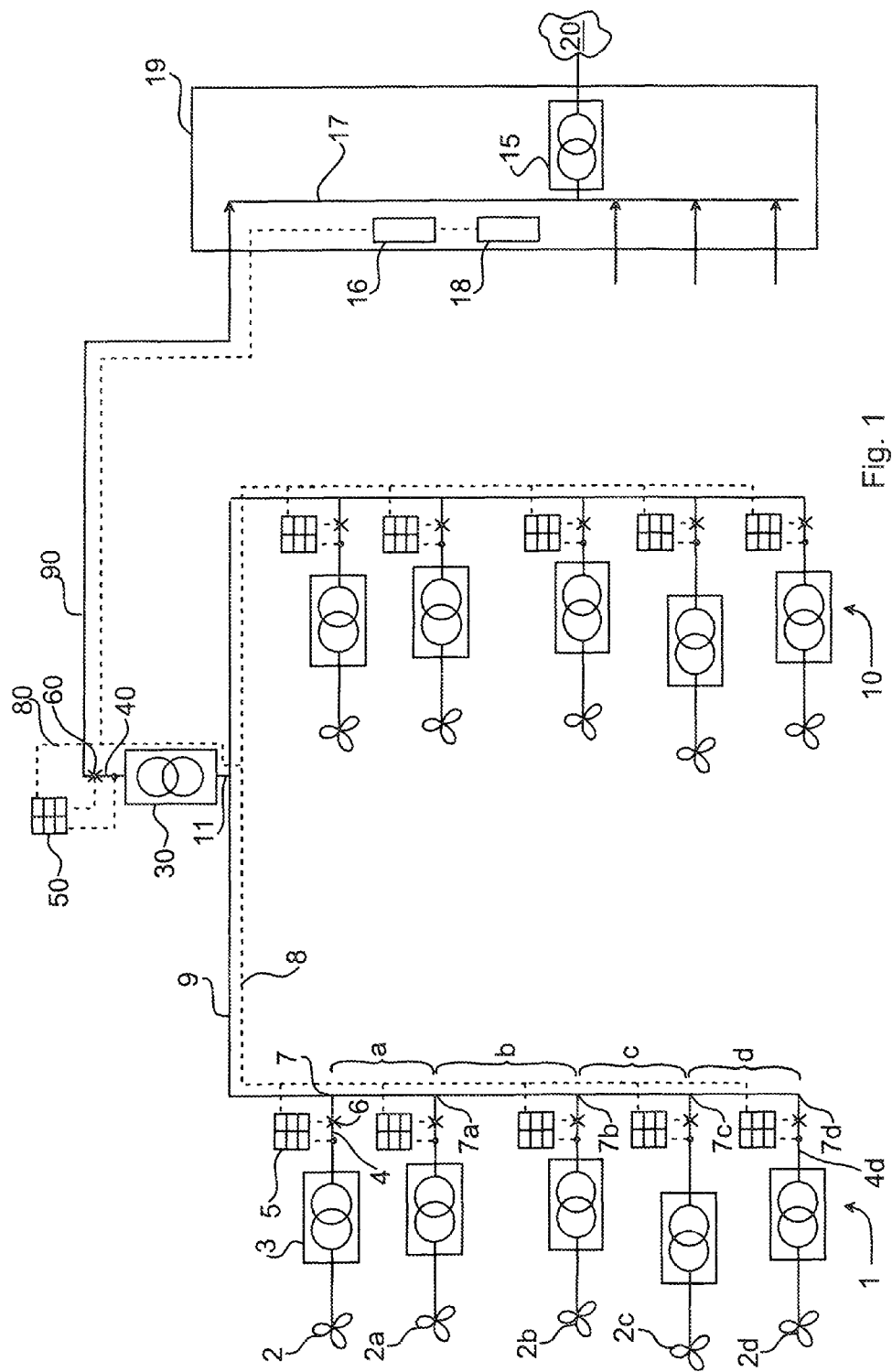
FIG. 1 illustrates a power transfer system and a protection system according to the invention for protecting the power transfer system.

FIG. 1 illustrates a windmill farm including a cluster of windmills that convert wind power into electric power. This wind power generating system comprises two clusters 1, 10 of wind power generators, each cluster including a plurality of wind power generating units comprising a wind mill, or wind power generator 2, connected to a transformer 3. The wind power generators generate electricity from wind energy by means of their turbines and each transformer 3 steps up the voltage of the electric power from the respective wind power generator 2. An alternative is to use wind power generating units 2 without a transformer and transfer the electric power through the system at the generated voltage, so that each wind power generator is connected directly to the transfer system. The transfer system includes a cable grid leading to a bus bar 17, for further transfer to an electric power grid 20. The bus bar 17 may be provided at a central substation 19 for several multi-terminal transfer cable systems arranged at wind farms at sea, each multi-terminal transfer cable system leading from one or more clusters of wind power generating units, and provide a common link, for example an under water high voltage dc- or ac-link, for the generated electric power to a power grid 20 ashore, such as a national power grid.

Each wind power generating unit 2 is connected via a circuit breaker 6 to the transfer system. The transfer system comprises a multi-terminal cable 9 with branches 4, each cable branch end is provided with a circuit breaker 6 and arranged at a wind power generating unit 2, 3 for inputting electric power into the transfer system. A single transformer 30 is provided at the other end of the multi-terminal cable, which end comprises a common cable 11 into which all cable branches lead. The common cable 11 constitutes an input cable for the transformer 30. A common output cable 40 exits from the transformer 30, and the output cable 40 ends with a circuit breaker 60 for connecting the transfer system to a transfer cable 90 and further to the substation 19. Thus, the illustrated power system includes wind power generating units 2, 3 in clusters 1, 10 of wind power generating units that via a multi terminal transfer system 4, 9, 11, 40 and a transfer cable 90 collects and leads the generated power to a sub station 19 for further transmission to a power consuming grid 20. This transfer system includes several power inputs at respective circuit breakers 6 and leads electric power to a electric power output at single circuit breaker 60. The input circuit breakers 6 and the output circuit breaker 60 mark the peripheral points of the transfer system and the protection zone provided by the invention. Protection equipment 5, 50 is arranged at each peripheral point (at 6, 60). Each protection equipment 5, 50 is operatively connected with a respective circuit breaker 6, 60, and arranged to trip the circuit breaker 6, 60 when a fault occurs within the protected zone. Thus, the protected zone includes a multi-terminal input (at each circuit breaker 6) that is connected, by means of a multiplicity of cable branches 4, 9, joining a single cable 11, to a single output terminal (at circuit breaker 60) via a transformer 30. Each wind power generator 2 is provided at each input 4, 6, and a single output 40, 60 is provided for the power from all wind power generators (2, 2a-d).

Respective protection equipment 5, 50 is provided at each input 4 and at the output 40. The protection equipment 5, 50 is provided to measure the current at the respective cable 4, 40, and transmit current values corresponding to the measured current to a central protection control unit 16. The transmitted current values enable the protection system to determine, by means of the control unit 16, if a discrepancy between input current and output current indicate a circuit fault between the inputs and the output. The protection equipment 5, 50 is also being provided to trip the respective circuit breaker 6, 60 if the central control unit 16 determines that a differential fault exists within the protected zone.

The protection system is a differential fault protection system, which basically summarizes the current entering the protected zone and compares the sum with the current exiting the zone. The protection system is adapted to consider the power steps taken by the transformer 30 of the system. For example, if the ratio of the transformer is 1:11, stepping up the voltage from 12 kV to 132 kV, the output current measured is multiplied by eleven to facilitate direct comparison with the sum of the input currents. Moreover, the protection system is adapted to compensate for charging currents in the cables of the system, and also detect a transformer inrush current so as not to trip the protective circuit breakers 6, 60 when the current difference between input and output current rise during charging of cables or magnetization of the transformer, respectively, without any fault of the cable branches or other fault within the protected zone.

For a differential protection system to work properly, it is important to measure all currents at the same time instance. It is also important to transfer the current values fast and reliably so that all current values are available when summarizing the current values. For this purpose the protection system of FIG. 1 uses an optic fiber communication system, including optical fiber 8 incorporated and following the cables 4, 9, 40, 90. Such a communication system has the advantage that the transmission length, and therefore times, are the same between each respective protection equipment 5, 50 and the central control unit 16. This facilitates the provisions of synchronizing the current measurements. So called Echo-timing may be used for synchronizing, or alternatively a GPS receiver may be used in each protection equipment (GPS=the Global Positioning System).

Figure 3:
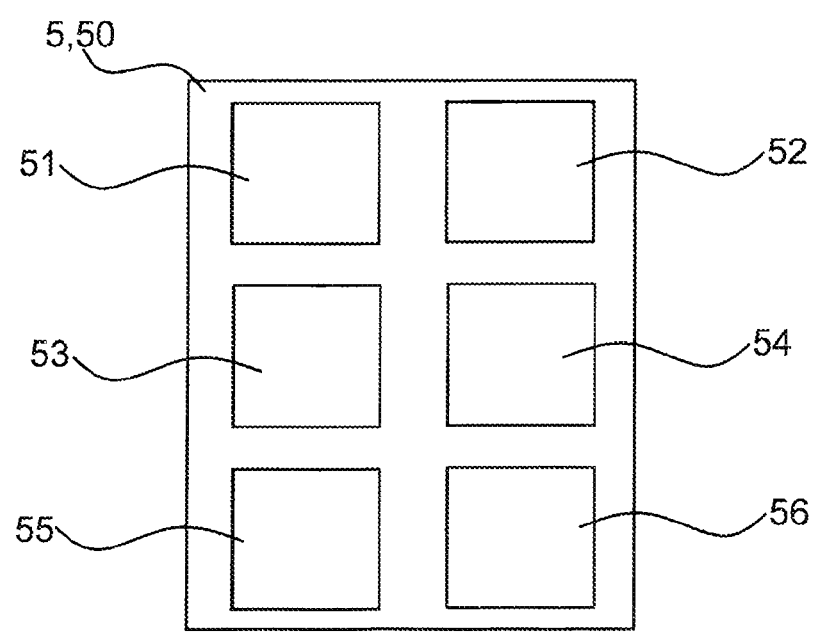
FIG. 3 illustrate a protection equipment in accordance with the invention.

FIG. 3 illustrate a protection equipment unit 5, 50. The functions and units 51-56 of the protection equipment unit will be described in the following, and may be implemented as a combination of hardware and software, e.g. comprising input and output units for receiving measurement signals and control the circuit breaker, an optical fiber connector for communicating, and a micro processor employing a memory storing a computer program suitable for controlling the protection equipment to perform its different functions. Such units 51-56 and functions may share a common processor and a common memory or include task specific and/or dedicated processors and memories.

The protection equipment 5, 50 comprises a measuring unit 51 for measuring current and voltage of a cable (4, 40), a communication unit 52, especially for communicating with a central master protection unit 16, and a control unit 53 for tripping a circuit breaker 6. Each protection equipment unit is adapted to measure the current of the cable (where it is arranged) and transmit information of the cable current to the central control unit, and receive a response, such as a trip command, from the central control unit, and to trip the circuit breaker 6 upon receiving such a trip command.

The protection equipment unit 5, 50 is also provided with a charging current compensator 54, and a transformer inrush current determiner 55. The charging current compensator 54 is adapted to determine if the current of the cable includes a cable charging current and compensate the measured current value by subtracting an estimated charging current. The protection equipment 5, 50 is further adapted to transmit the compensated current value to the central control unit 16 (the master protection unit) so that the differential protection can use the compensated current as a basis for the differential fault determination, and do not break the current mistakenly by interpreting a charging current of a cable as a cable fault.

The protection equipment 5, 50 is also adapted to receive topology information from the master protection unit 16, which topology information the protection equipment 5, 50 uses to determine a suitable compensation value for the charging current. For this purpose the protection equipment includes a database 56 including estimations of charging currents for different topologies of the power system. The protection equipment is therefore adapted to receive the topology information, such as a topology identifier, for retrieving a charging current compensation value from the data base, which database may include a table having an estimation value of the charging current for each topology identifier. During use, the protection equipment receive measuring signals in the measuring unit 51, the measuring unit 51 samples the signals into measurement values that the charging current compensator 54 analyzes to discover a capacitive charging current. Upon detecting a charging current, the compensator 54 retrieves a current compensation value corresponding to stored topology, compensates for the charging current, i.e. subtracts the compensation from the measured current, and the communication unit 52 transmits the compensated current to the central control unit 16. The communication unit 52 receives a topology identifier, indicating the present electrical topology, which it stores in the database. The communication unit 52 may also receive a trip command from the master control unit 16. If a trip command is received by the protection equipment, the circuit breaker control unit 53 trips the circuit breaker that the protection equipment is operatively connected to.

Each protection equipment 5, 50 is also provided with a transformer inrush current determiner 55 adapted to detect a transformer inrush current, e.g. by analyzing the measured current and deduce if the current includes a second harmonic that indicates a transformer being energized. The inrush current determiner 55 is provided to prevent unnecessary breaking of the circuit breakers during transformer magnetization. The inrush current determiner 55 may suitable be adapted to block communication, e.g. by setting a signal or data indicator selectively enabling and disabling communication, at least enabling and disabling transmission of the current to the central control unit 16.

The second harmonic stabilization is a well proven method, where the typical second harmonic at inrush is used for blocking the differential current protective function. Additional features for inrush blocking may also be used.

Figure 2:
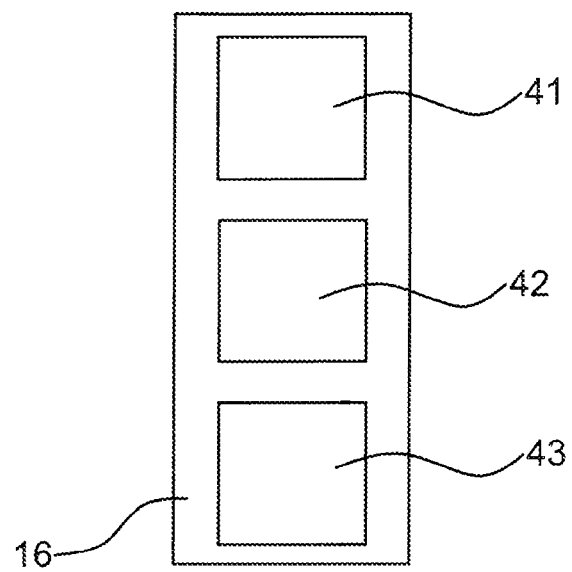
FIG. 2 illustrates a master control unit for use in the protection system.

FIG. 2 illustrates the central control unit 16 functioning as a master protection unit 16 that controls the circuit breaking function of the protection equipment by transmitting trip commands to each protection equipment, and provides the differential fault protection from the current values received from the protection equipment units, i.e. the master protection unit summarizes the compensated input currents and the compensated output current to determine a circuit fault. The master protection unit 16 includes a communication unit 41 for receiving the current values and a differential fault determiner 42 for analyzing the current values. The master protection unit 16 also includes a topology determiner 43 that identifies which electrical topology the transfer system currently defines. A topology identifier is subsequently transmitted from the master protection unit 16 to the, or each, protection equipment unit 5, 50. The topology determiner 43 may determine the topological state of the transfer system from the received currents, by identifying which parts of the multi terminal cable that at the present time transfer electricity. Alternatively, the master protection unit 16 may receive information of the topology from a control unit 18 of the power system, for example a control unit of the substation 19.

The master protection unit 16 receives the compensated current values and the differential fault determiner 42 subtracts the compensated input currents from the compensated output current.

An alternative is to let the central master protection unit 16 compensate for the charging currents centrally, i.e. the measured currents are transferred. In such an alternative, the topology identifiers need not be transferred to the protection equipment units 5, instead the master protection unit 16 should be adapted to compensate the currents, or the summarized input currents and subtracted output current, for the charging currents of the system, such as compensate using a total charging current for the system that is linked to the present topology at any given point of time. Thus, the master protection unit 16 should in this case include a database of different topologies and corresponding charging currents. Upon receiving a current value from a cable hitherto being uncharged, the master protection unit 16 should compensate for the charging currents of this cable and of the cables that this cable will charge, which information should be deduced from the system topology and suitably be stored for fast access during use.

When charging of a cable begins, the measured current is compensated by the charging current of that cable during the charging event. A variation of the charging current in a cable can be determined when the power system is designed. The varying charging current differs and depends on the cable in question, such as the length and type of cable. Charging current determinations that are used for calculating cable charging for line differential protection, and/or measurements, are known as such and can be used when designing the system, which charging currents may be a time varying from a large start value evolving into a lower steady state value. The charging currents for each specific electric topology of the grid are stored to be easily retrieved for fast access during compensation of the measured currents.

The charging currents are determined based on the expected charging of the cables and cable sections, such as the illustrated sections a-d of cable 9. For example, when only the power generator 2 closest to the output is connected, all the sections a-d are uncharged. This means that a connection of the second generator 2a will charge the corresponding cable 4 of the generator 2a and one section 9a, closest to the output, of cable 9. The fifth power generator 2d will, if the fifth power generator is connected second to the first generator 2a, have to charge its input cable 4d and the four sections 9a-d of cable 9.

Figure 4:
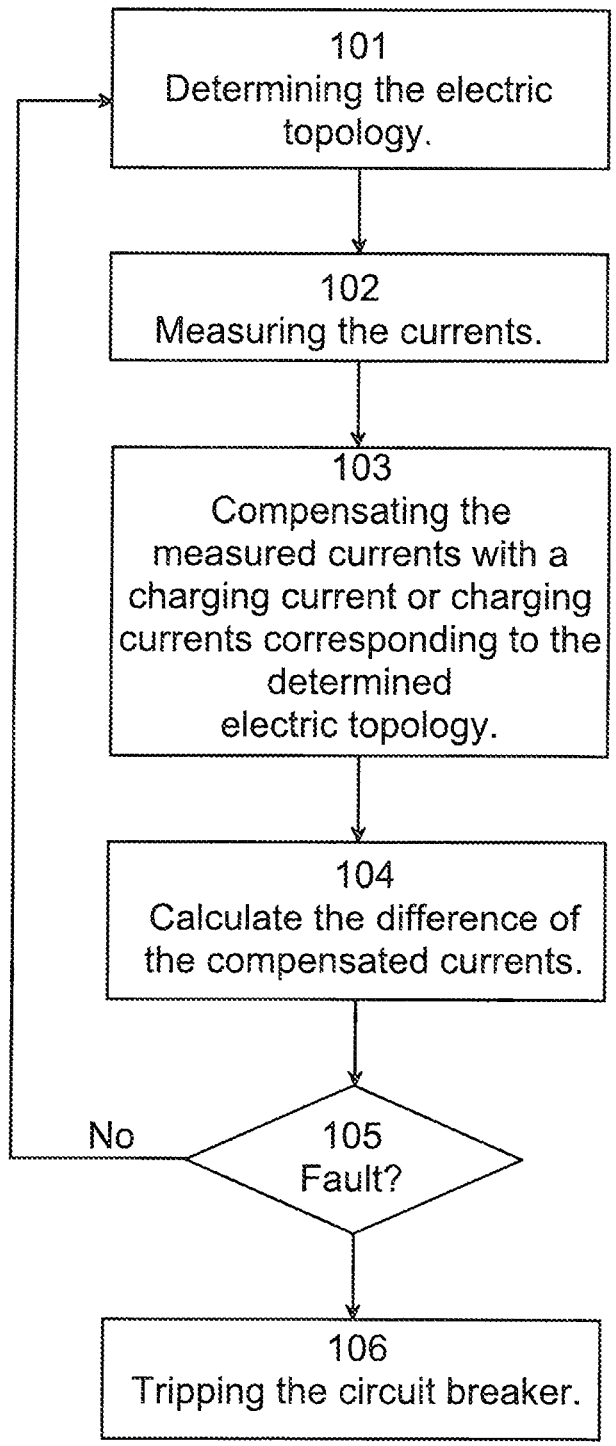
FIG. 4 is a flowchart describing a differential protection method in accordance with the invention.

FIG. 4 summarizes the differential protection method and begins in step 101 with determining the electric topology of the power transfer system. This determination is based on the present use of the power cables 4, 9, 11, so the electric topology describing the power cables 4, 9, 11, and sections of power cables a, b, c, d, being in use at the present, i.e. being charged, and the power cables 4, 9, 11 and sections of power cables used a, b, c, d being unused for power transfer, and which upon connection of a power generator 2, 2a-d by means of the corresponding circuit breaker will be charged. The method continues with the step 102 of measuring the current and voltage of the input and output cables 4, 40, by means of each respective protection equipment unit (5, 50). In the following step 103 a compensation for charging currents of the cables and sections of cables (4, 9, 11, 40) of the transfer system are made using charging currents corresponding to the determined electric topology. Differential faults are discovered in step 104 wherein the compensated incoming currents of the input cables 4 are compared to the outgoing current of the output cable 40. The compensation may include charging currents of all cables of the transfer system 4, 9, 11, 40. If the calculations result in, i.e. the difference when subtracting outgoing current from incoming currents, a value that is larger than a comparatively small threshold, a fault is detected. If a fault is detected, the method ends with tripping the circuit breakers 6, 60 of the protected zone. If no fault is detected the method returns to the step of determining the electrical topology 101.

The protection system may also be provided with other compensation functions such as a capacitive current compensation during steady state, which steady state should be identified and compensated for depending on the present electrical topology of the transfer system, i.e. which parts that transfer current at the point of time in question.

In addition, a number of other known differential protection methods and corresponding equipment may be implemented and employed when using the protection system, method and equipment of the invention, such as continuous estimation of differential current at no-fault condition; charging current calculation during continuous operation; pre-fault charging current estimation kept during faults; subtraction of the false pre-fault differential currents.

What is claimed is:

1. A differential protection system for a power transfer system, which power transfer system comprises
   a plurality of power cables including a plurality of input power cables for transfer of power from electric power generators,
   an output cable, wherein the plurality of input power cables are connected to the output cable,
   each input and output power cable being provided with a respective circuit breaker, wherein each circuit breaker of the input power cables provides a power input to the transfer system, and the circuit breaker of the output cable provides a power out for the transfer system,
   the protection system comprises a plurality of protection equipment unit each being adapted to be arranged at a respective one of the input cables or at the output cable, each protection equipment unit including a measuring unit for measuring the current and voltage of the cable, and including a control unit being operatively connectable to the circuit breaker of the respective power cable for selectively tripping the circuit breaker when the protection system discovers a differential fault,
   the protection system comprises at least one charging current compensator for compensating the differential protection for charging currents of the cables of the transfer system,
   the transfer system being arranged to transfer power from a varying number of the electric power generators wherein the power cables being in use varies,
   and wherein the protection system is adapted to adjust the compensation based on a determined electric topology from a present use of the power cables.

2. The differential protection system according to claim 1, comprising a database including charging currents, wherein the adaptation of the charging current compensation includes using charging currents stored in the database.

3. The differential protection system according to claim 2, comprising a topology determiner for determining the electrical topology of the transfer system, and the database includes a charging current for each topology.

4. The differential protection system according to claim 1, comprising a master protection unit for controlling each of the protection equipment units.

5. The differential protection system according to claim 4, the master protection unit comprising a communication unit, each protection equipment units comprising a communication unit for operatively connecting the master control unit to each of the protection equipment units.

6. The differential protection system according to claim 4, wherein the master protection unit comprises the topology determiner.

7. The differential protection system according to claim 4, wherein the master protection unit comprises a differential fault determiner, the protection system discovers differential faults by means of the differential fault determiner using currents provided from measurements by the measuring units of protection equipment units.

8. The differential protection system according to claim 1, wherein each of the protection equipment units of the input cables comprising a charging current compensator for providing a charging current compensation upon connecting the respective input cable.

9. The differential protection system according to claim 8, wherein each protection equipment unit of the power input cables comprises an inrush current determiner adapted to block communication between the protection equipment unit and the master protection unit, when detecting an inrush current of a transformer of the transfer system.

10. The differential protection system according to claim 1, further comprising a transformer inrush current determiner for detecting inrush current of a transformer of the protected power transfer system, and wherein the protection system is adapted to block the differential protection during a transformer inrush current.

11. The differential protection system according to claim 1, wherein the transfer system includes a multi-terminal transfer cable connecting the input cables to the output cable, the protection system being adapted for compensating for the charging of different sections of the multi-terminal cable.

12. A method differential protection of a power transfer system, which power transfer system comprises
   a plurality of power cables including a plurality of inputs power cables for transfer of power from electric power generators,
   an output cable, wherein the a plurality of input power cables are connected to the output cable,
   each input and output power cable being provided with a respective circuit breaker, wherein each circuit breaker of the input power cables provides a power input to the transfer system, and the circuit breaker of the output cable provides a power out for the transfer system,
   the transfer system being arranged to transfer power from a varying number of the electric power generators wherein the power cables being in use varies, the method comprises
   determining the electric topology from the present use of the power cables,
   measuring the current and voltage of the input and output cables,
   compensating for charging currents of the cables of the transfer system using charging currents corresponding to the determined electric topology,
   selectively tripping the circuit breakers of the respective power cable upon discovering a differential fault.

13. The method according to claim 12, wherein the compensating includes retrieving stored charging currents corresponding to the electric topology.

14. The method according to claim 12, including monitoring the power cables for a transformer inrush current and inactivating the differential protection during an inrush current.

15. The method according to claim 12, including transmitting the compensated charging currents from local protection equipment units to a master protection control unit, performing a differential protection calculation for discovering faults in the master protection and upon discovering a fault transmitting trip commands to the protection equipment units.

16. A protection equipment unit for differential protection of a power transfer system, which power transfer system comprises a plurality of power cables including
   a plurality of input power cables for transfer of power from electric power generators, an output cable, wherein the plurality of input power cables are connected to the output cable, each input and output power cable being provided with a respective circuit breaker, wherein each circuit breaker of the input power cables provides a power input to the transfer system, and the circuit breaker of the output cable provides a power out for the transfer system, the transfer system being arranged to transfer power from a varying number of the electric power generators wherein the power cables being in use varies, the protection equipment unit being adapted to be arranged at a respective one of the input cables or at the output cable,
   the protection equipment unit comprises
   a measuring unit for measuring the current and voltage of the cable,
   a control unit being operatively connectable to the circuit breaker of the power cable for selectively tripping the circuit breaker,
   a charging current compensator for compensating the differential protection for charging currents of the cables of the transfer system,
   a communicating unit, the protection equipment unit being adapted for transmitting a compensated current by means of the communicating unit,
   wherein the protection equipment unit is adapted for receiving an electric topology identification of the power transfer system, and
   wherein the charging current compensator adapted to adjust the compensation for the varying use of the transfer system by using charging currents corresponding to the determined electric topology.

17. The protection equipment unit according to claim 16, comprising a database for storing a plurality of stored charging currents, each corresponding to an identifier of an electric topology, and wherein the charging current compensator is adapted to retrieve a charging current stored in the database corresponding to the received electric topology information.

18. The protection equipment unit according to claim 16, comprising a transformer inrush current determiner operatively connected to the communication unit and adapted to block the communication unit from transmitting upon detecting a transformer inrush current.

* * * * *